Patented Nov. 23, 1926.

1,607,977

UNITED STATES PATENT OFFICE.

HARRY H. ARMSTRONG, OF LOS ANGELES, CALIFORNIA.

METHOD OF RECOVERING HYDROCARBON OILS FROM OIL SANDS AND THE LIKE.

Application filed May 15, 1922. Serial No. 561,171.

This invention relates to a process for recovering the oil from oil bearing mineral troleum oil, exists in sand, sandstone, limevaluable fractions from the oil of the formations in an economical manner.

It is well known that oil, particularly petroleum oil, exists in said, sandstone, limestone, and saturates the surface of the ground where it has seeped or has been allowed to flow from an unchecked source, as in the instance of oil well sumps, etc. Also shales contain both free and consolidated oils. The term "oil sands" is used in this specification to designate partially or completely saturated mineral formations.

The object of this invention is to provide a process for treating oil sands, oil shales, etc., whereby the oil may be economically separated or derived from the sand and shale, and if advisable, can at the same time, be separated and fractionated into its more valuable constituents. These and other objects will hereinafter be more fully and obviously described.

The figures of the drawings illustrate more or less diagrammatically an apparatus that may be used for carrying out my improved process.

The present invention consists generally of separating oil from "oil sands" by a process that does not necessarily require heat, but on the other hand, if heat is employed for certain grades and to extract certain fractions, it is not of sufficient temperature to cause excess cracking. The separation is accomplished by bringing gas containing percentages of condensable natural hydrocarbon vapors into intimate contact with the "oil sand." In the place of the above gas, which may be natural gas or the like, condensable natural vapors, in vapor or atomized form, may be used. I designate the gas, condensable natural vapors, etc., by the word "gas." The sands may be treated with the gas either when cooled, or at atmospheric temperatures, or when heated. Many condensable natural vapors, such as butane, $C_4H_{10}$, may be employed instead of mixed gases such as casing-head or natural gas containing gasoline vapors. The process may be assisted when treating certain grades of "oil sand" by the heating of the sand itself or the gas, or both.

In some cases it is advantageous to employ steam to hasten the separation of the oil and the condensable natural products when heat is employed.

Under some conditions also, it is found to be more economically valuable to operate the process under a vacuum, thereby lowering the boiling points of the various vapors of oil and its lighter fractions.

I employ the use of vapors because it is obvious that this form presents the greatest possible surface to the "oil sands" and greatly hastens the operation. The use of liquid solvents, etc., requires more mechanical operation and a longer time to achieve the same results.

In the treatment of oil sands and shales combined or oil shales alone either a condensable natural hydrocarbon vapor or liquid hydro-carbon solvent may be employed. The vapor or liquid may be heated before applying it to the mixture or to the shale. The vapor-treated material or the submerged and saturated material as above described, will, because of the uniform covering of hot vapor or hot liquid solvent, have a greater tendency to give up a superior product. Oil separated or extracted from the mixture of oil sand and oil shale or oil shale alone will be of greater volume and of very superior quality to that which is separated or extracted by the ordinary retort methods. A solvent separated or extracted from the mixture of oil sand and oil shale or from oil shale itself has decided advantages over any other unrelated solvents from other oil sources.

In order to render the operation of the process clear, I append two drawings in which—

Figure 1:
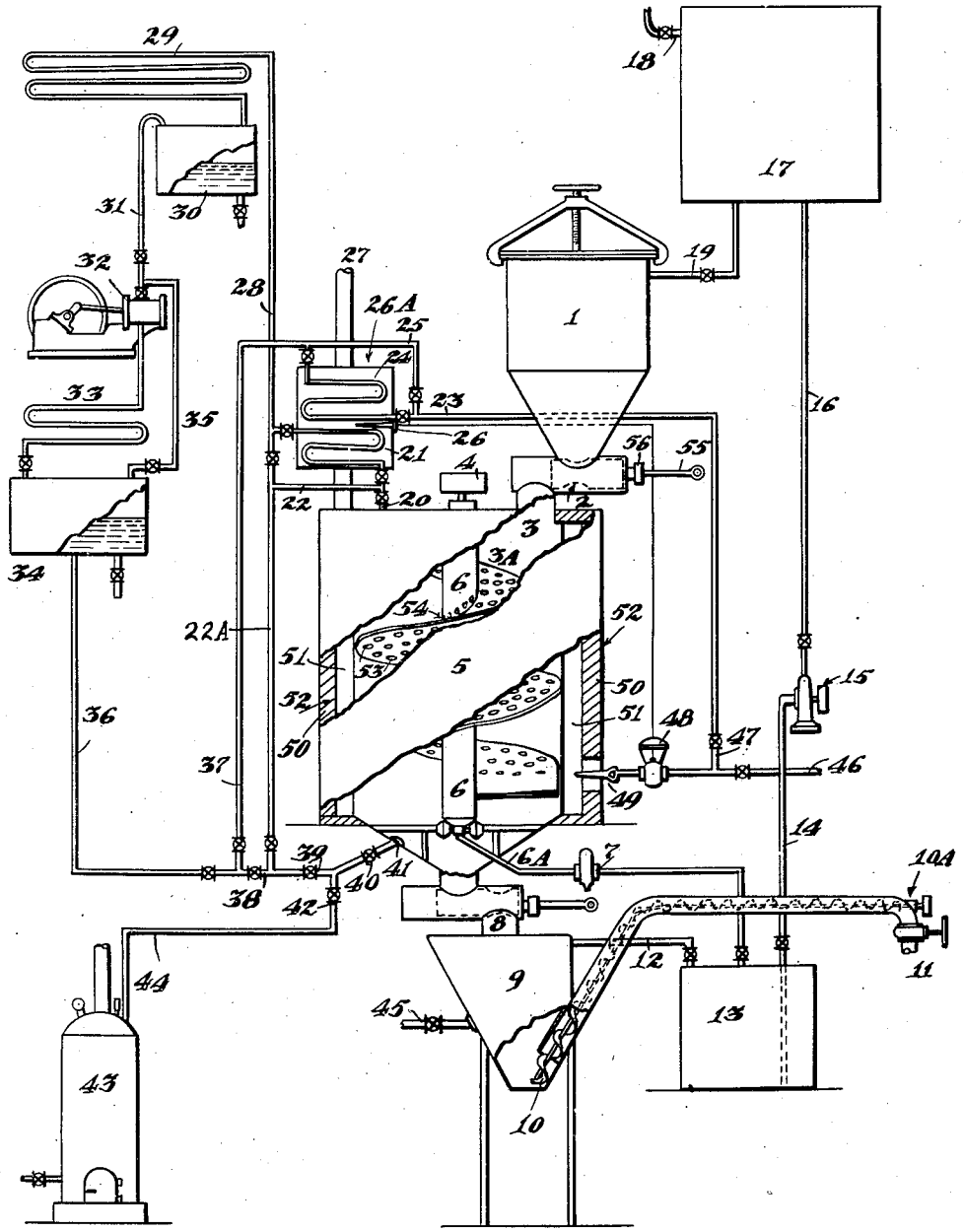
Fig. 1 is a semi-diagrammatic view of the complete apparatus.

Referring to Fig. 1, it will be noted that the apparatus, as shown, permits of a continuous operation under all conditions described.

Oil sand, shale, etc., in granulated form is placed in hopper 1, from which hopper it passes through cylinder valve 2 and on to perforated screen conveyor 3ᴬ at point 3. This conveyor, 3ᴬ gradually spreads out the sand in treating chamber 5 by reason of its turning action caused by pulley 4, this action carrying the oil sand down counter current to the "gas" which enters the bottom of chamber 5 through screened port 41. The conveyor is inclined slightly from the outer edge toward the bearing cylinder 6.

The "gas" passing up through the granulated "oil sand" comes into intimate contact with the oil, which absorbs or commingles with the "gas". The viscosity of the oil is rapidly lowered and the Bé. gravity is raised, rendering it much more liquid and thereby more easily separable from the sand. By starting the "oil sand" down through the treater at 3 and shortly thereafter turning the "gas" in at port 41, the oil rapidly becomes more liquid and flows by gravity down through the screened holes 54 and through discharge 6 through valve 7 into storage 13 through pipe 6ᵃ. If advisable, and providing a small amount of oil still remains in the sand after it passes through cylinder valve 8 into separating chamber 9, water can be injected through pipe 45 to float off such residue oil through discharge 12 intermittently as required. The sand residue is removed from the chamber 9 by a conveyor 10 driven by a suitable means, as indicated at 10ᴬ, said sand being discharged at 11. It may at times be found advantageous to inject some additional oil with the oil sand at 3, thereby hastening the absorption of the gas and the consequent liquefying and flowing qualities of the oil. This may be done by pumping oil from storage 13, through pipe 14, with pump 15, into oil supply tank 17, through pipe 16. The oil gravitates from tank 17 through pipe 19 and into intake 3, as shown. If desired, a liquid solvent may be supplied to the material to be treated through the pipe 18.

When heat is used, the sand or shale is fed into treater 5 as first described, from hopper 1 and on to conveyor 3ᵃ. The treating chamber is heated by burner 49, which extends through insulated wall 50 into chamber 51, tangentially. This burner 49 is supplied with a gear from the pipe 46 and is thermostatically controlled by valve 48 and its connected thermostat 26, shown in preheating chamber 26ᴬ. The gas supplied by the pipe 46 will be a gas containing a relatively high percentage of natural hydrocarbon vapors or it may be relatively pure butane or propane. The stack gases pass out of furnace 51 on through the preheating chamber 26ᴬ, in which the heating of vapor coils 21 and 24 takes place. The stack gases escape from stack 27 to the atmosphere, as shown.

The "oil sand" being heated as above described, is then treated with "gas", which "gas" may be heated, the same "gas" being injected through port 41, this "gas" comes through valve 47 and pipe 23 through preheated coil 24, and through supply pipe 37, valve 40 and port 41. The entire apparatus may be held under higher than atmospheric pressure, or under atmospheric pressure, or under a vacuum. The latter is preferable in most cases. A vacuum may be maintained by drawing on vapor line 20—22, through pipe 28 and condenser 29, through storage tank 30 and pipe 31, to the suction of compressor 32. Under the above conditions the oil in the heated "sands" will rapidly vaporize in the presence of the "gas", and the "gas" as a carrier will pass out with the oil vapors through discharge 20—22, etc., where part of the condensable vapors drop out into storage tank 30. The remainder of the "gas" and condensable vapors passes through pipe 31 into compressor 32 where they are put under pressure which may range from a few pounds to 250 lbs. depending on the products that are to be extracted by compression and subsequent cooling. The gases under pressure pass through condenser 33 and are partly or entirely condensed into an expanded liquid. This liquid is usually a hydrocarbon of high Bé. gravity and in some cases is what may be termed a liquefied gas, such as butane, $C_4H_{10}$, which has a Bé. gravity of about 110 deg. A gas of this character can be expanded, and because of its latent heat of evaporation is valuable for refrigerating purposes.

By intermittently operating the plant at atmospheric temperatures and then under heat, a liquified gas of the above kind can be utilized through pipe 36 and injected into the treater through port 41 instead of the ordinary "gas" supply. By expanding the liquefied gas with the above qualities through the "oil sand" in treater 5, the refrigerating action greatly hastens the absorption of the liquefied gas by the oil in the sand, and it assists subsequent liquefying of the oil very materially. In other words the raising in gravity and the lowering of viscosity is more rapidly accomplished.

The use of a liquefied gas reduces the necessary quantity of vapors to be handled through the condensing and compressing apparatus, because of the fact that it can be entirely liquefied and no residue gas passes out. In some instances it may be desirable that the gas passing from the treating chamber at 20 be recirculated through said chamber one or more times at certain intervals and this may be done by suitably operating the required valves to cause said gas to be entrained through pipe 22 and pipe 22$^A$ to the port 41 to re-enter the treating chamber along with the other substances then being injected through the port 41, the valve 38 in this instance being closed.

Figure 2:
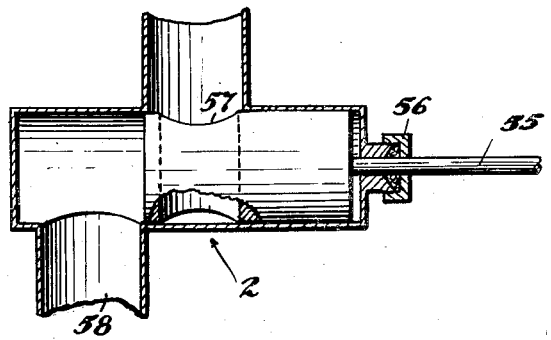
Fig. 2 is an enlarged section through the feed valve.
Figure 3:
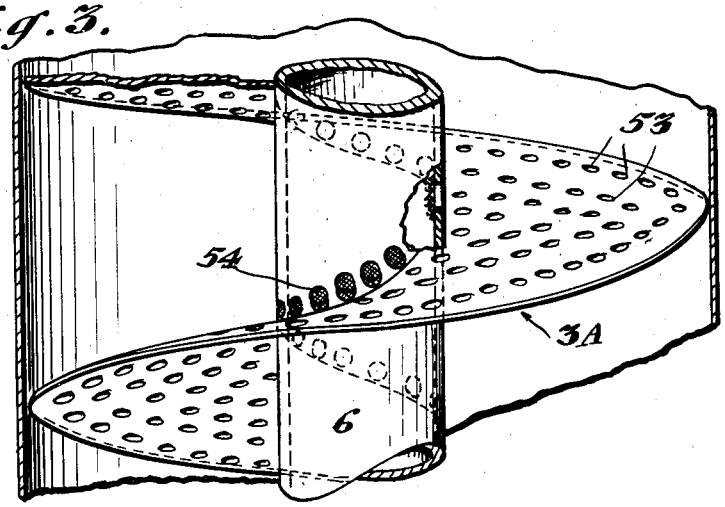
Fig. 3 is an enlarged sectional view illustrating a portion of the treating chamber.

I have shown a steam supply in boiler 43 and steam line 44. Steam may thus be used and injected through a control valve 42 and into port 41 in order to soften the oil sand. The steam may be passed into the "oil sand" after the "gas", with it or before the "gas" is used. If heat is used in addition to the steam and gas the entire quantity of resultant vapors will pass out and be liquefied in the condensing apparatus as shown. Fig. 2 shows the feed and discharge valves 2 and 8. Fig. 3 shows a section of the treater 5. Screened ports 54 allow the separated liquid to flow into discharge pipe 6. Holes 53 permit the "gas" to pass into the "sands" and through them.

Figure 4:
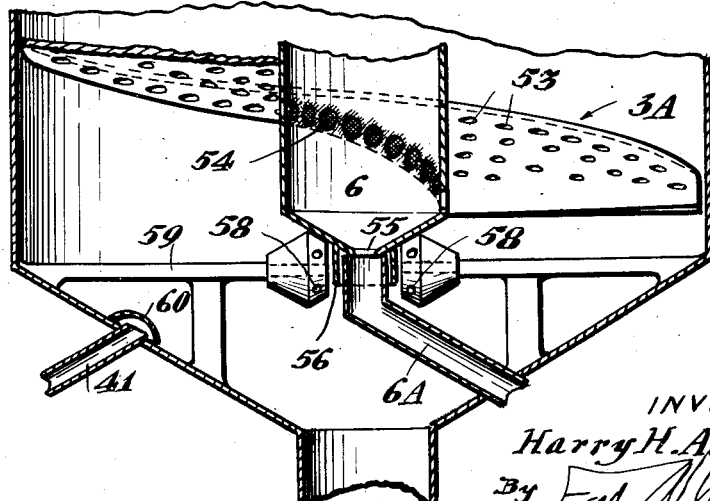
Fig 4 is a similar enlarged sectional view illustrating the lower portion of said treating chamber.

Fig. 4 shows the discharges for sand and liquid and intake port 41, covered by screen cap 60, for injecting the "gas", steam, etc. Bearing shafts 59 and rollers carrying raised bumps 58 show how the cylinder 6 and its conveyor 3$^A$ is agitated. Discharge port 55 allows the separated liquid to flow into pipe 6$^A$ protected by cap 56.

What is claimed is:

1. The method of separating the oil from oil sands and the like which consists in subjecting the sand to butane, $C_4H_{10}$, gas, and separating the oil, which absorbs said gas, from the sand.

2. The method of separating the oil from oil sands and the like which consists in subjecting the sand to a liquefiable natural hydrocarbon gas, and separating the oil, which absorbs said gas, from said sand by gravity.

3. The method of separating the oil from oil sands and the like which consists in subjecting the sand to butane, $C_4H_{10}$, gas, and separating, by gravity, the oil, which absorbs said gas, from said sand.

4. The method of separating the oil from oil sands and the like which consists in spreading out the sand, subjecting the sand to a liquefiable natural hydrocarbon gas, and separating the oil, which absorbs said gas, from said sand.

5. The method of separating the oil from oil sands and the like which consists in spreading out the sand, passing a liquefiable natural hydrocarbon gas through the spread sand, and separating the oil, which absorbs said gas, from said sand.

6. The method of separating the oil from oil sands and the like which consists in spreading out the sand, subjecting the spread sand to a liquefiable natural hydrocarbon gas, butane, $C_4H_{10}$, and separating the oil, which absorbs said gas, from said sand.

7. The method of separating the oil from oil sands and the like which consists in spreading out the sand, passing a liquefiable natural hydrocarbon gas, butane $C_4H_{10}$, through the spread sand, and separating the oil, which absorbs said gas, from the sand.

8. The method of separating the oil from oil sands and the like which consists in spreading out the sand, subjecting the sand to a liquefiable natural hydrocarbon gas, and separating, by gravity, the oil, which absorbs said gas, from said sand.

9. The method of separating the oil from oil sands and the like which consists in spreading out the sand, passing a liquefiable natural hydrocarbon gas through the spread sand, and separating, by gravity, the oil, which absorbs said gas, from the sand.

10. The method of separating the oil from oil sands and the like which consists in spreading out the sand, subjecting the spread sand to a liquefiable natural hydrocarbon gas, butane $C_4H_{10}$, and separating the oil, which absorbs said gas, from said sand by gravity.

11. The method of separating the oil from oil sands and the like which consists in spreading out the sand, passing a liquefiable natural hydrocarbon gas, butane $C_4H_{10}$, through the spread sand, and separating the oil, which absorbs said gas, from the sand by gravity.

12. The method of separating the oil from oil sands, which consists in subjecting the sand to a liquefiable natural hydrocarbon gas under pressure higher than atmospheric, and separating the oil, which absorbs said gas, from the sand.

13. The method of separating the oil from oil sands, which consists in subjecting the sand to a liquefiable natural hydrocarbon gas, butane $C_4H_{10}$, under pressure higher than atmospheric, and separating the oil, which absorbs said gas, from the sand.

14. The method of separating oil from oil sands and the like which consists in treating a mixture of oil sand and shale with a liquefiable natural hydrocarbon gas, and separating the oil, which absorbs the gas, from said mixture.

In testimony, that I claim the foregoing as my own, I have hereto affixed my signature.

HARRY H. ARMSTRONG.